(12) United States Patent
Batouq et al.

(10) Patent No.: US 11,153,275 B2
(45) Date of Patent: Oct. 19, 2021

(54) METHOD TO TRANSFER PROCESS DATA UTILIZING HIGHLY SECURE BOUNDARY NETWORKS

(71) Applicant: Saudi Arabian Oil Company, Dhahran (SA)

(72) Inventors: Mohammed A. Batouq, Abqaiq (SA); Prem Kumar, Abqaiq (SA); Omar A. Mohisin, Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 83 days.

(21) Appl. No.: 16/799,320

(22) Filed: Feb. 24, 2020

(65) Prior Publication Data
US 2021/0266290 A1    Aug. 26, 2021

(51) Int. Cl.
*H04L 29/06* (2006.01)

(52) U.S. Cl.
CPC ................. *H04L 63/0209* (2013.01)

(58) Field of Classification Search
CPC .................................................. H04L 63/0209
See application file for complete search history.

(56) References Cited

U.S. PATENT DOCUMENTS

| | | |
|---|---|---|
| 6,192,281 B1 | 2/2001 | Brown et al. |
| 6,742,040 B1 | 5/2004 | Toga |
| 7,379,999 B1 * | 5/2008 | Zhou ............... G06F 11/3476 709/224 |
| 10,018,993 B2 | 7/2018 | Lawson et al. |
| 10,796,235 B2 * | 10/2020 | Radkiewicz ............ G06N 5/04 |
| 10,877,465 B2 * | 12/2020 | Nixon ................ G05B 19/4184 |
| 10,979,480 B2 * | 4/2021 | Singh ..................... H04L 65/80 |
| 2005/0240994 A1 | 10/2005 | Burcham et al. |
| 2011/0138457 A1 | 6/2011 | Jolfaei |
| 2016/0006673 A1 * | 1/2016 | Thomas .................. H04L 47/70 709/226 |

FOREIGN PATENT DOCUMENTS

CN        102970278 A     3/2013

OTHER PUBLICATIONS

William Grosso, "Java RMI: Chapter 22. HTTP Tunneling", "http://proquest.safaribooksonline.com", Oct. 22, 2001, 29 pages.
International Search Report and Written Opinion in Corresponding PCT Application No. PCT/US2021/019168 dated May 7, 2021. 9 pages.

* cited by examiner

*Primary Examiner* — Trang T Doan
(74) *Attorney, Agent, or Firm* — Leason Ellis LLP (57) ABSTRACT

A method of transferring process data from a secure network protected by a first firewall to an unsecure network protected by a second firewall using an existing interface is provided. The existing interface is configured to transfer the process data having a first format from the secure network to the unsecure network through the first and second firewalls. The process data further includes new data having a second format. The method includes: receiving the new data from a first application in the secure network; converting the new data from the second format to a binary format; writing the binary data to the existing interface as further process data having the first format; receiving the binary data from the existing interface; converting the binary data from the binary format to the new data having the second format; and making the new data available to a second application in the unsecure network.

21 Claims, 3 Drawing Sheets

FIG. 2

METHOD TO TRANSFER PROCESS DATA UTILIZING HIGHLY SECURE BOUNDARY NETWORKS

FIELD OF THE DISCLOSURE

The present disclosure relates generally to a method to transfer process data utilizing highly secure boundary networks, and specifically to an automated method to transfer process data from a secure network protected by a first firewall to an unsecure network protected by a second firewall using an existing interface.

BACKGROUND OF THE DISCLOSURE

Production facilities often utilize a dedicated network for process control that is separated from the company information technology (IT) and business networks. At times, digital information such as real-time process data needs to be electronically communicated from a control system in a company's production facility to a corresponding corporate IT network in the company. The control system is often a highly secure computer network, with network access limited to those who need it. By contrast, the corporate IT network may be much less secure, with access to many or all in the company, and perhaps to some outside the company. The protection layer between the control system and the IT network often includes one or more highly secure boundary networks. However, this complex protection can greatly limit the traffic sent between the control system and the IT network. This limited information exchange can eventually limit engineering and management access to crucial information needed to make better decisions.

It is in regard to these and other problems in the art that the present disclosure is directed to provide a technical solution for an effective method to transfer process data in a production facility's control system to a corporate IT network utilizing highly secure boundary protection.

SUMMARY OF THE DISCLOSURE

According to an embodiment, an automated method of transferring process data from a secure network protected by a first firewall to an unsecure network protected by a second firewall using an existing interface is provided. The existing interface is configured to transfer the process data having a first format from the secure network to the unsecure network through the first and second firewalls. The process data further includes new data having a second format different from the first format. The method comprises: receiving, by an outbound circuit in the secure network, the new data from a first application in the secure network; converting, by the outbound circuit, the received new data from the second format to a binary format; writing, by the outbound circuit, the converted binary data to the existing interface as further process data having the first format; transferring, by an interface circuit between the first and second firewalls, the written binary data through the first and second firewalls using the existing interface; receiving, by an inbound circuit in the unsecure network, the transferred binary data from the existing interface; converting, by the inbound circuit, the received binary data from the binary format to the new data having the second format; and making, by the inbound circuit, the converted new data available to a second application in the unsecure network.

In an embodiment, the process data, the further process data, or both can be real-time data being transferred from the secure network to the unsecure network across their respective firewalls.

In an embodiment, the existing interface is further configured to transfer the process data having the first format through a data diode between the first and second firewalls, the data diode being configured to permit communication from the secure network to the unsecure network while restricting communication from the unsecure network to the secure network.

In an embodiment, the existing interface is further configured to transfer the process data having the first format through a demilitarized zone (DMZ) between the first and second firewalls, the DMZ being configured to further protect the secure network.

In an embodiment, the process data having the first format comprises time-series data from the first application and the new data comprises alarm data from the first application.

In an embodiment, the existing interface is further configured to prevent transfer of the new data having the second format from the secure network to the unsecure network.

In an embodiment: the existing interface comprises a real-time tag configured to track a real-time time-series data stream having the first format from the first application to the second application; and writing the converted binary data comprises writing the converted binary data as the real-time tag.

In an embodiment, the method further comprises recognizing, by the inbound circuit, the received binary data as having the binary format, wherein converting the received binary data comprises converting the recognized binary data from the binary format to the second format in order to recover the new data.

According to another embodiment, a system for automated transfer of process data from a first application in a secure network to a second application in an unsecure network is provided. The system comprises: a first firewall configured to protect the secure network; a second firewall configured to protect the unsecure network; an existing interface configured to transfer the process data having a first format from the secure network to the unsecure network through the first and second firewalls, the process data further including new data having a second format different from the first format; an outbound circuit in the secure network and configured to receive the new data from the first application, convert the received new data from the second format to a binary format, and write the converted binary data to the existing interface as further process data having the first format; an interface circuit between the first and second firewalls and configured to transfer the written binary data through the first and second firewalls using the existing interface; and an inbound circuit in the unsecure network and configured to receive the transferred binary data from the existing interface, convert the received binary data from the binary format to the new data having the second format, and make the converted new data available to the second application.

In an embodiment, the system further comprises a data diode between the first and second firewalls, the data diode being configured to permit communication from the secure network to the unsecure network while restricting communication from the unsecure network to the secure network, wherein the existing interface is further configured to transfer the process data having the first format through the data diode.

In an embodiment, the system further comprises a demilitarized zone (DMZ) between the first and second firewalls, the DMZ being configured to further protect the secure network, wherein the existing interface is further configured to transfer the process data having the first format through the DMZ.

In an embodiment, the process data having the first format comprises time-series data from the first application and the new data comprises alarm data from the first application.

In an embodiment, the existing interface is configured to prevent transfer of the new data having the second format from the secure network to the unsecure network.

In an embodiment: the existing interface comprises a real-time tag configured to track a real-time time-series data stream having the first format from the first application to the second application; and writing the converted binary data comprises writing the converted binary data as the real-time tag.

In an embodiment, the inbound circuit is further configured to recognize the received binary data as having the binary format and converting the received binary data comprises converting the recognized binary data from the binary format to the second format in order to recover the new data.

According to yet another embodiment, a computer-readable medium (CRM) comprising one or more non-transitory storage media containing instructions that, when executed on one or more computer processors, cause the processors to perform an automated method of transferring process data from a secure network protected by a first firewall to an unsecure network protected by a second firewall using an existing interface is provided. The existing interface is configured to transfer the process data having a first format from the secure network to the unsecure network through the first and second firewalls. The process data further includes new data having a second format different from the first format. The method comprises: receiving the new data from a first application in the secure network; converting the received new data from the second format to a binary format; writing the converted binary data to the existing interface as further process data having the first format; transferring the written binary data through the first and second firewalls using the existing interface; receiving the transferred binary data from the existing interface; converting the received binary data from the binary format to the new data having the second format; and making the converted new data available to a second application in the unsecure network.

In an embodiment, the existing interface is further configured to transfer the process data having the first format through a data diode between the first and second firewalls, the data diode being configured to permit communication from the secure network to the unsecure network while restricting communication from the unsecure network to the secure network.

In an embodiment, the existing interface is further configured to transfer the process data having the first format through a demilitarized zone (DMZ) between the first and second firewalls, the DMZ being configured to further protect the secure network.

In an embodiment, the process data having the first format comprises time-series data from the first application and the new data comprises alarm data from the first application.

In an embodiment, the existing interface is further configured to prevent transfer of the new data having the second format from the secure network to the unsecure network.

In an embodiment: the existing interface comprises a real-time tag configured to track a real-time time-series data stream having the first format from the first application to the second application; and writing the converted binary data comprises writing the converted binary data as the real-time tag.

In an embodiment, the instructions, when executed on the one or more computer processors, further cause the processors to recognize the received binary data as having the binary format, wherein converting the received binary data comprises converting the recognized binary data from the binary format to the second format in order to recover the new data.

Any combinations of the various embodiments and implementations disclosed herein can be used. These and other aspects and features can be appreciated from the following description of certain embodiments together with the accompanying drawings and claims.

BRIEF DESCRIPTION OF THE DRAWINGS

It is noted that the drawings are illustrative, not to scale, and that the same or similar features have the same or similar reference numerals throughout.

DETAILED DESCRIPTION OF CERTAIN
EMBODIMENTS OF THE DISCLOSURE

In example embodiments of the present disclosure, a method to transfer process data in a production facility's control system to a corporate IT network utilizing highly secure boundary protection is provided. In some such embodiments, a component is installed in the facility process network to collect new required data to send to the corporate network. After collection, the component utilizes a script to convert the collected new data into its binary format. The binary format data is then loaded or written as a tag of an existing data link already communicating with the facility corporate network. If the facility is currently only sending real-time process data, for example, to the corporate network, then the new component can write additional process data (such as process alarms) to the existing established link with no need to modify firewall access lists or data diode scripts. This is done by converting the process alarms data into binary and then writing them to the application sending the real-time data as real-time tags. On the company (corporate) network side, the received data is converted back to its original format and utilized by users or alarm management systems in the corporate network.

As discussed above, production facilities often utilize a dedicated network for process control that is separated or isolated from the company IT and business networks. The process control network is often interfaced through highly secure boundary networks that greatly limit the traffic between the facility and the company corporate network.

This helps protect an important asset of a company by better restricting access to such real-time process data and control information to those with a need to know. However, as a result of this network protection, facilities often only send limited information to the corporate network, which limits the engineering and management access to crucial data and results needed for informed decision making.

Accordingly, in some embodiments, a system for automated transfer of process data is provided, and such process data can be, in certain implementations, real-time process data. The process data is transferred from a first application in a secure network to a second application in an unsecure network. The system includes a first firewall configured to protect the secure network from unauthorized network traffic coming or going, and a second firewall configured to protect the unsecure network from unauthorized network traffic coming or going. The system also includes an existing interface (such as a real-time tag-identified process data link) configured to transfer the process data from the secure network to the unsecure network through the first and second firewalls. The existing interface works on real-time process data having a first format (such as real-time sensor values). However, the first application would also like to transfer further process data (e.g., new data) having a second format (such as a spreadsheet) different from the first format using the existing interface. For instance, because of reasons such as practicality, security, and simplicity, it may not be possible to provide another interface for transferring this second format data.

To this end, the system further includes an outbound circuit in the secure network that is configured (e.g., programmed) to receive the new data from the first application, convert the received new data from the second format to a binary format, and write the converted binary data to the existing interface as further real-time process data having the first format. That is, the outbound circuit converts the second format data into a more generic format (binary) that can be supplied to and transferred through the existing interface as first format data. In addition, the system includes an interface circuit between the first and second firewalls that is configured to transfer the written binary data through the first and second firewalls using the existing interface. The system also includes an inbound circuit in the unsecure network that is configured to receive the transferred binary data from the existing interface, convert the received binary data from the binary format to the new data having the second format, and make the converted new data available to the second application. That is, the inbound circuit recognizes the received data as really being in a binary format and applies a reverse conversion to take the binary format data back to the second format to recover the new data.

According to various embodiments, this approach maintains the same level of security in the company and does not require changes to a facility's data security policies or settings. For example, in some such embodiments, the process control network is interfaced through firewalls with the business network to transfer real-time process data to the corporate IT network. In addition, the approach can be used to collect different important and useful data from a facility and make these different data available to company management and engineers who do not have direct access to the process networks. In some embodiments, the protection layer between the two networks includes multiple firewalls (such as a facility firewall and a corporate firewall) with a demilitarized zone (DMZ) network in the middle (between the facility and corporate firewalls). In some embodiments, more highly secure setups include data diode installation to limit the traffic from the company corporate network to the facility network.

According to various embodiments of the present disclosure, a method to transfer new process data utilizing highly secure boundary networks is provided, and without creating additional interfaces between control systems and other systems. Instead, an existing interface is used, where the existing interface transfers process data from the control systems to other systems having a different format than the new process data. Here, new process data may come from other sources in the control systems and that are not currently managed by a real-time data management system. Processors in the control systems are configured (e.g., programmed) to embed the new process data in the existing interface. In some such embodiments, rather than creating a new interface for the alarm management data, the system is programmed to embed the new process data in the already established interface for the real-time data application.

In accordance with a salient aspect of the present disclosure, by avoiding the creation of new interfaces, there is no need to add new rules in the firewalls or otherwise change the security policy of the facility. This also decreases the number of open ports in the firewalls, which further improves security. In addition, this provides more flexibility for facilities to transfer data needed at the company side and without going through the lengthy challenges of safely modifying the existing IT network security infrastructure.

For ease of description throughout, terminology and concepts are expressed based on implementations which utilize the OSIsoft PI (Process Information) System real-time data management system. For example, when writing data as a real-time tag (such as for storing time-series data), this can be implemented in PI System using a PI tag or PI Point. However, the terminology and concepts are equally applicable to other real-time data management systems, and the OSIsoft PI System is intended to be exemplary and is not a requirement of any given embodiment constructed in accordance with this disclosure.

In an embodiment, a real-time data management system such as PI System manages real-time time-series process data from a facility, transmitting the process data securely from the facility to the company IT network through existing firewalls using an existing real-time tag interface (such as a PI Point). Now suppose the facility wants to send other process data (such as alarm data, which could, for example, be in a spreadsheet format like Excel) that is not part of the time-series process data already being sent. Suppose further that the facility wants to use the existing interface, even though the alarm data is not real-time time series data like the existing interface expects to transfer. In this embodiment, the facility has a processor (e.g., laptop, workstation, server) configured by code to convert the other process data to binary, and then send this converted binary data as part of the existing interface through the firewalls using the real-time tag. In a sense, the other process data is disguised as the normal time-series process data sent using the tag.

Continuing, on the other end, at the corporate IT network, another processor (e.g., server) is configured by code to receive the sent binary data and convert it back to its original format (such as a spreadsheet). For example, the receiving processor might recognize the received data as binary or not real-time time-series data, such as being a particular code value, or being an irregular time-series data, or other such convention or circumstance. In this case, the receiving processor is further configured to convert the received binary data back to its original format (e.g., using a reverse conversion to that of the sending processor at the facility). In this manner, alarm report data can be collected and sent from the facility to the company IT network using the real-time tag as if the data was the normally transmitted real-time time-series process data. In one such embodiment, the sending processor is configured to convert the alarm data report in Excel format to binary through a pre-written script. Once the data is converted, it is written as a PI tag in a PI interface (e.g., using a PI Point in a PI to PI interface) that is communicating through the firewalls. On the other (receiving) end, the receiving processor is configured to receive the PI tag data and convert the received binary format data to its original (Excel) format using s similar pre-written script that reverses the process and writes the received values to an Excel spread sheet. The spreadsheet can then be displayed in the company IT network, such as through a web interface.

In one such specific embodiment, a pre-written script converts the alarm numbers in the control systems network to binary data through the conversion of the Excel file reports (that are created in the control systems) to binary data. These can then be processed like time-series process data by writing the binary data to a PI tag and passed to PI in an IT network through the PI to PI interface. In other words, an existing tag (and corresponding interface) in PI is used to receive the binary data stream. The PI thus sends along a string of binary values representing the spreadsheet, only appearing to be normal time-series process data. The Excel reports are then reconstructed on the receiving end (other end of the PI interface, at the company IT network), where they can be, for example, sent by email to the concerned people, or displayed on a web dashboard, to name a few of the possible actions. In this fashion, the existing PI to PI interface is used to send the new data securely across the highly secure boundary networks.

According to various embodiments, important or necessary data in production facilities' control systems is passed to the corporate IT network utilizing highly secure boundary protection. Production facilities often utilize one or more dedicated networks for process control and that are separated from the company IT and business networks. In some embodiments, the process control networks are interfaced through firewalls with the business network to transfer real-time process data to the corporate network. Here, the protection layer between the two networks includes multiple firewalls (such as a facility firewall and a corporate firewall) with a DMZ network in the middle. Some more highly secure embodiments include data diode installation to limit the traffic from the company corporate network to the facility. This complicated protection, however, comes at a cost. Such security greatly limits the traffic sent between the networks. As a result, facilities tend to send limited information to the corporate network, which can eventually limit engineering and management access to valuable information, such as information for making better decisions for the company.

In some embodiments, process data is transferred from production facilities' control systems to a corporate IT network utilizing highly secure boundary protection. The process data utilizes existing links already allowed through boundary firewalls instead of opening new ports in the firewalls. This is done by converting the required data to be sent, through a script, to its binary format and then writing this binary format as a tag value in the existing system already communicating through the firewalls. The binary values are then put back to their original format (at the corporate IT network) after passing through the firewalls, and then viewed externally.

In some embodiments, existing highly secure boundary networks only allow specific real-time (e.g., time-series) data traffic to pass through the firewalls. However, control systems alarm information also needs to be accessible for better management of alarms. In order to do this with no need to open new firewall ports, in some such embodiments, a pre-written script configures a sending server to read the alarm data directly from the alarm management system reports and convert the alarm data reports into a binary format. This binary format data is then written as a real-time tag (e.g., a PI Point or tag) and transferred through the firewalls as real-time time-series process data. At the receiving end, the binary format data is then converted back to the original alarm data and recovered as an alarm management report to be used by plant engineers and management to analyze alarm data. This approach maintains the same level of security in the company and does not require changes to the facilities' data security policies or settings. The approach can be used to collect different important and useful facilities' data and make such data available to company management and engineers, who do not have direct access to the process networks.

In an embodiment, a method to transfer alarm data from a process facility to the company corporate network using an existing process data interface across highly secure boundary networks is provided. Alarm data can be crucial to plant process engineers and maintenance crew to closely monitor and control process alarms. However, network security to safeguard the process facility from the much less secure company network can make it challenging to send such alarm data since it may not be captured as part of the existing real-time time-series data being collected and transferred from the process facility to the company network. Accordingly, in an embodiment, processors on the facility side are programmed to convert the alarm data from the facilities into a binary format and send as part of the real-time tag data already being collected. Likewise, processors on the company network side are programmed to recognize this binary data as the converted alarm data and convert it back to the alarm data format and share with plant engineers and other interested employees on the company side. This allows the engineers to perform the required studies and analysis as well as provide tight monitoring and control of process alarms by the engineers.

Figure 1:
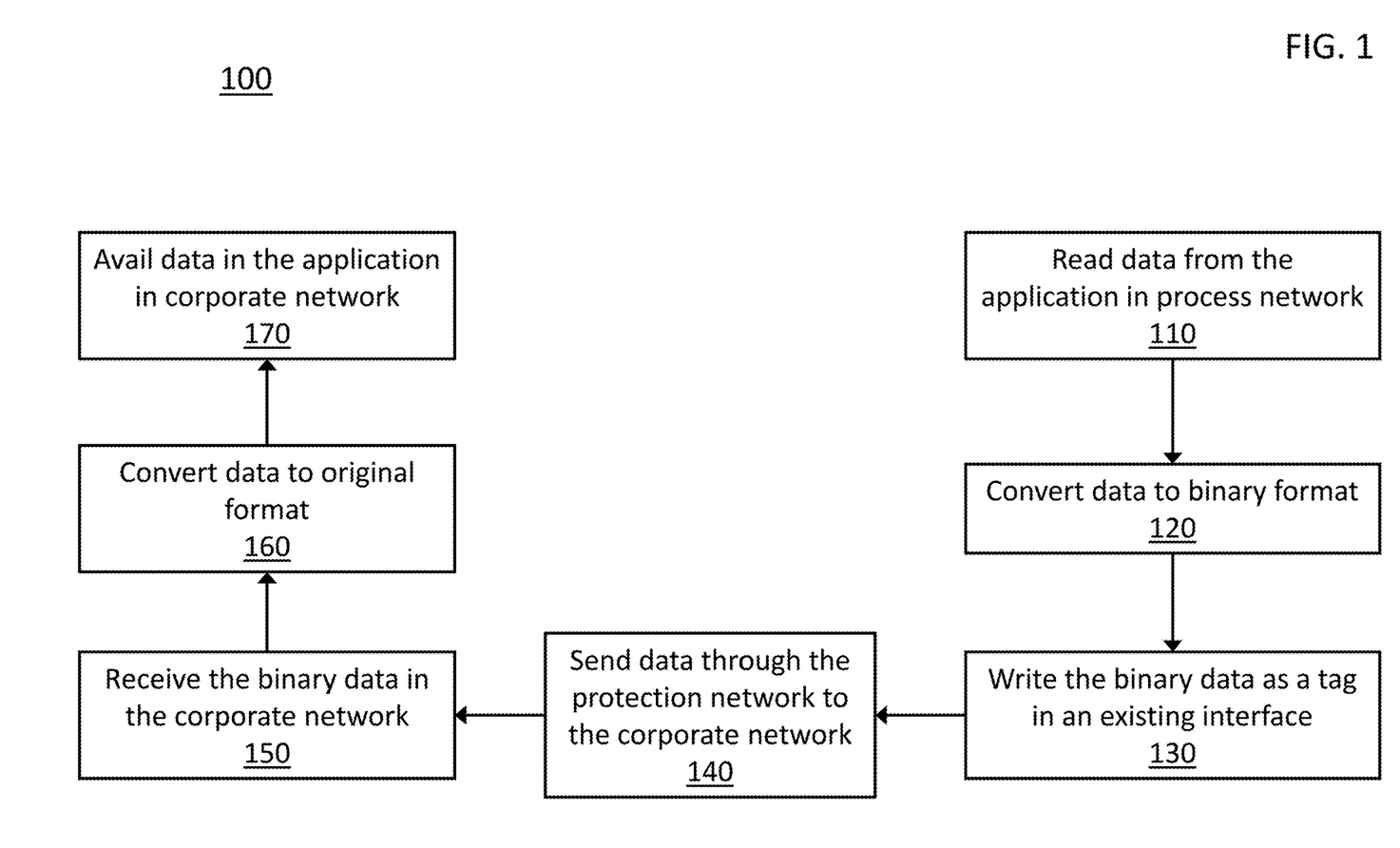
FIG. 1 is a flow diagram of an example method to transfer process data utilizing highly secure boundary networks, according to an embodiment.

FIG. 1 is a flow diagram of an example method 100 to transfer process data utilizing highly secure boundary networks, according to an embodiment which comprises at least a portion of the concepts explained above. The method 100 can be performed, for example, by one or more server computers or other processors configured by code stored in a non-transitory memory device to carry out one or more of the operations. The method 100 transfers new process data from an application in the process network (secure) to an application in the corporate network (unsecure) using an existing interface.

In further detail, in the method 100, processing begins with the step of reading 110 data (e.g., extra process data in a new format) from the application in the process network. The method 100 further includes the step of converting 120 the data (e.g., the new process data) to a binary format, so that it looks more like the type of data that an existing interface expects to see and transfer. In addition, the method 100 includes the step of writing 130 the binary data as a tag (e.g., a PI tag or PI Point) in the existing interface. The method 100 further includes the step of sending 140 the binary data through the protection network to the corporate network. For instance, the protection network can include multiple firewalls and possibly a DMZ or data diode, with the existing interface already passing tag data from the process network securely through the protection network to the corporate network. In addition, the method 100 includes the steps of receiving 150 the binary data in the corporate network and converting 160 the binary data to its original format. The method 100 further includes the step of availing 170 the new process data (in its original format) in the application in the corporate network.

Figure 2:
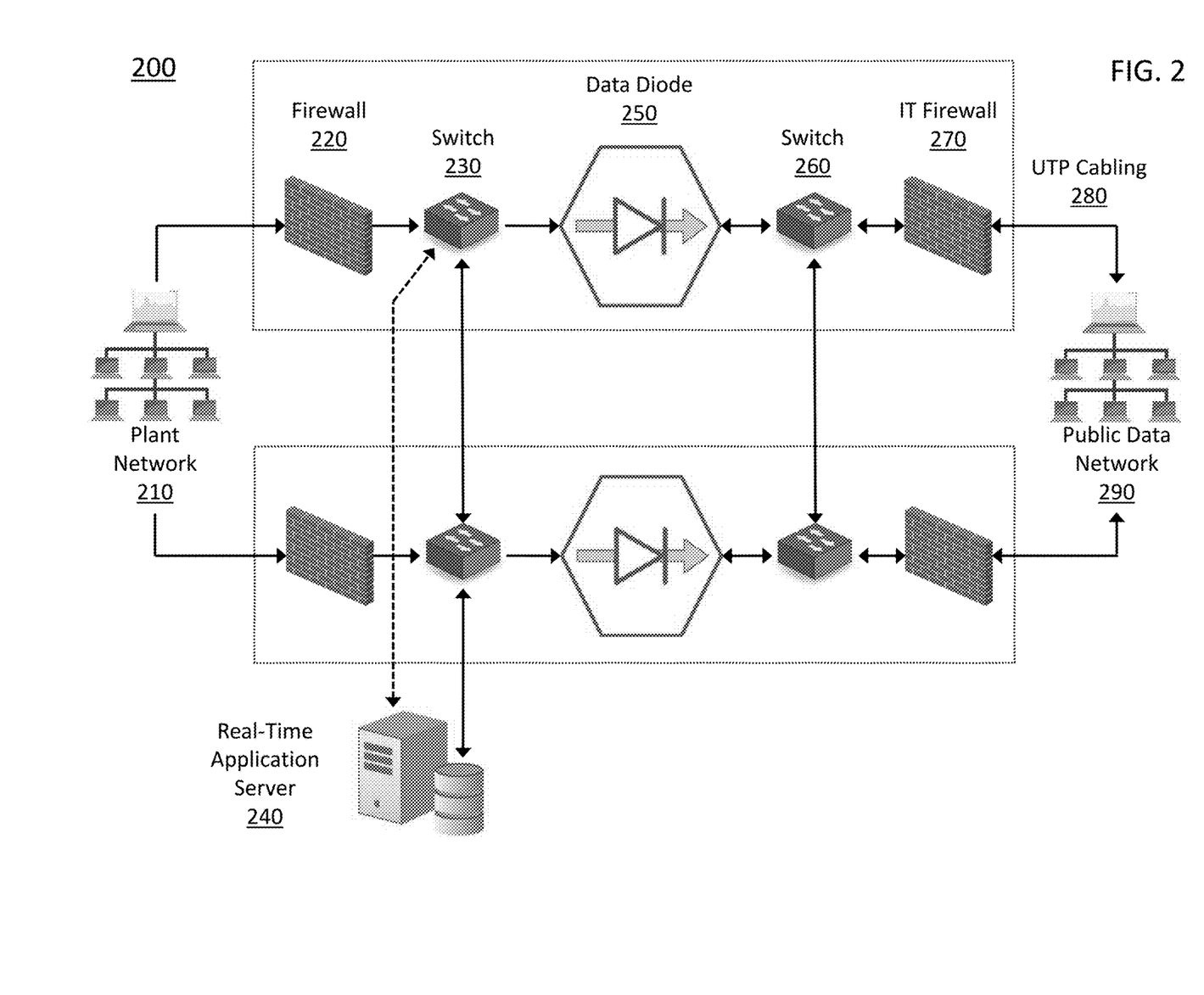
FIG. 2 is a schematic diagram of an example system for automated transfer of real-time process data from a first application in a secure network to a second application in an unsecure network, in accordance with one particular implementation consistent with the disclosure.

FIG. 2 is a schematic diagram of an example system 200 for automated transfer of real-time process data from a first application in a secure network 210 to a second application in an unsecure network 290, according to an embodiment. In FIG. 2, the secure network 210 is a plant network 210 while the unsecure network 290 is a public data network 290 (PDN). A protection network provides connectivity between the plant network 210 and the public data network 290. In FIG. 2, the protection network is illustrated as two separate subnetworks (each in their own box) that are linked at corresponding places. This linkage may be for reasons such as increased bandwidth, redundancy, and fault tolerance. As the two subnetworks of the protection network are identically connected and equipped, only the upper subnetwork is labeled and described further.

The protection network includes a first firewall 220 protecting the plant network 210 from unauthorized network traffic coming or going (e.g., in or out of the plant network 210). The protection network further includes a first switch 230 for redirecting network traffic to the other subnetwork (e.g., for load balancing, component failure, or the like). The first switch 230 is also for communicating with a real-time application server 240 (such as a PI Server). The PI Server 240 oversees the existing interface, which allows real-time time-series process data to be written as a real-time tag securely from the plant network 210 to the public data network 290. The PI Server 240 thus manages safe passage of the process data through the protection network.

The protection network further includes a data diode 250. The data diode 250 is a hardware device configured to permit communication from the secure network (plant network 210) to the unsecure network (public data network 290) while restricting communication from the unsecure network to the secure network. This level of hardware protection further secures the plant network 210 from unauthorized network traffic reaching it. In addition, the protection network includes a second switch 260 for redirecting network traffic to the other subnetwork (e.g., for substantially similar reasons as the first switch 230, such as rebalancing the network traffic across the two subnetworks, or to route around a faulty or inactive component such as a firewall or data diode). The protection network further includes a second firewall 270 (e.g., an IT firewall) protecting the public data network 290 from unauthorized network traffic coming or going (e.g., in or out of the PDN 290).

It should be noted that the IT firewall 270 does not turn the unsecure network 290 into a secure network. Most of the security exposure of the public data network 290 comes from the wide accessibility of the PDN 290 (e.g., many users, many applications, many network connections, particularly with unsecure networks such as the Internet). As illustrated in FIG. 2, the system 200 further includes unshielded twisted pair (UTP) cabling 280 for connecting the PDN 290 with the IT firewall 270. It should also be noted that the use of the data diode 250 is optional. In some embodiments, there is no data diode, while in some other embodiments, it is replaced with another network protection component, such as a DMZ network.

Figure 3:
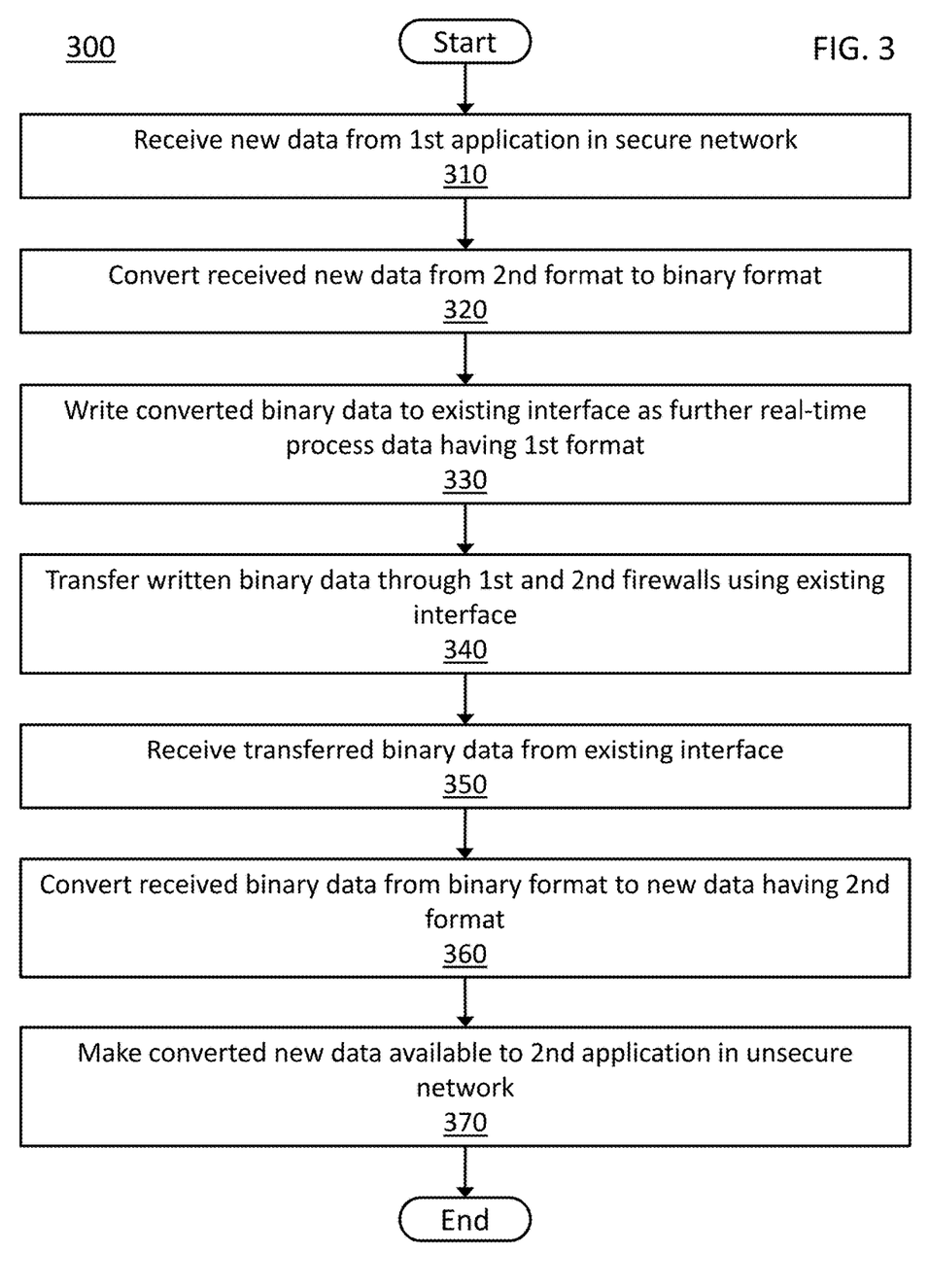
FIG. 3 is a flow diagram of an example automated method of transferring real-time process data from a secure network protected by a first firewall to an unsecure network protected by a second firewall using an existing interface, in accordance with one particular implementation consistent with the disclosure.

FIG. 3 is a flow diagram of an example automated method 300 of transferring process data from a secure network (such as plant network 210) protected from unauthorized network traffic by a first firewall (such as first firewall 220) to an unsecure network (such as public data network 290) protected from unauthorized network traffic by a second firewall (such as IT firewall 270) using an existing interface (such as a real-time tag), according to an embodiment. The existing interface is configured (such as by code) to transfer the process data having a first format (such as, in one implementation, real-time time-series data) from the secure network to the unsecure network through the first and second firewalls. The process data further includes new data having a second format (such as a spreadsheet) different from the first format. The process data can be real-time or other data that is to be transferred from the secure network to the unsecure network through the first and second firewalls.

Some or all of the method 300 can be performed using components and techniques illustrated in FIGS. 1 and 2. Portions of this and other methods disclosed herein can be performed on or using a custom or preprogrammed logic device, circuit, or processor, such as a programmable logic circuit (PLC), computer, software, or other circuit (e.g., ASIC, FPGA) configured by code or logic to carry out their assigned task. The device, circuit, or processor can be, for example, a dedicated or shared hardware device (such as a laptop, a single board computer (SBC), a workstation, a tablet, a smartphone, part of a server, or a dedicated hardware circuit, as in an FPGA or ASIC, or the like), or computer server, or a portion of a server or computer system. The device, circuit, or processor can include a non-transitory computer readable medium (CRM, such as read-only memory (ROM), flash drive, or disk drive) storing instructions that, when executed on one or more processors, cause portions of the method 300 (or other disclosed method) to be carried out. It should be noted that in other embodiments, the order of the operations can be varied, and that some of the operations can be omitted. Some or all of the method 300 can also be performed using logic, circuits, or processors located on or in electrical communication with a platform configured to carry out the method 300.

In the example method 300, processing begins with the step of receiving 310, by an outbound circuit (such as a server or other computer in the plant network 210) in the secure network, the new data from a first application (such as further data from a process controlled through a process control system) in the secure network. The method 300 further includes the step of converting 320, by the outbound circuit, the received new data from the second format to a binary format (such as a plainer form of data capable of being transmitted using the existing interface). In addition, the method 300 includes the step of writing 330, by the outbound circuit, the converted binary data to the existing interface as further real-time process data (such as a PI tag) having the first format. The method 300 further includes the step of transferring 340, by an interface circuit (such as PI Server 240) between the first and second firewalls, the written binary data through the first and second firewalls using the existing interface.

In addition, the method 300 includes the step of receiving 350, by an inbound circuit (such as a server or other computer in the public data network 290) in the unsecure network, the transferred binary data from the existing interface. The method 300 further includes the step of converting 360, by the inbound circuit, the received binary data from the binary format to the new data having the second format. In one such embodiment, this step includes recognizing, by the inbound circuit, the received binary data as having the binary format. Once recognized, converting the received binary data includes the step of converting the recognized binary data from the binary format to the second format in order to recover the new data. Returning to FIG. 3, the method 300 further includes the step of making 370, by the inbound circuit, the converted new data available to a second application in the unsecure network (such as a web interface for public access).

In some embodiments, the existing interface is further configured to prevent transfer of the new data having the second format from the secure network to the unsecure network. As such, conversion of the new data to binary (and writing it to the existing interface as a real-time tag) can be seen as one possible workaround to move the new data to the unsecure network from the secure network.

The methods described herein may be performed in part or in full by software or firmware in machine readable form on a tangible (e.g., non-transitory) storage medium. For example, the software or firmware may be in the form of a computer program including computer program code adapted to perform some or all of the steps of any of the methods described herein when the program is run on a computer or suitable hardware device (e.g., FPGA), and where the computer program may be embodied on a computer readable medium. Examples of tangible storage media include computer storage devices having computer-readable media such as disks, thumb drives, flash memory, and the like, and do not include propagated signals. Propagated signals may be present in a tangible storage media, but propagated signals by themselves are not examples of tangible storage media. The software can be suitable for execution on a parallel processor or a serial processor such that the method steps may be carried out in any suitable order, or simultaneously.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to a viewer. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. An automated method of transferring process data from a secure network protected by a first firewall to an unsecure network protected by a second firewall using an existing interface, the existing interface being configured to transfer the process data having a first format from the secure network to the unsecure network through the first and second firewalls, the process data further including new data having a second format different from the first format, the method comprising:
   receiving, by an outbound circuit in the secure network, the new data from a first application in the secure network;
   converting, by the outbound circuit, the received new data from the second format to a binary format;
   writing, by the outbound circuit, the converted binary data to the existing interface as further process data having the first format;
   transferring, by an interface circuit between the first and second firewalls, the written binary data through the first and second firewalls using the existing interface;
   receiving, by an inbound circuit in the unsecure network, the transferred binary data from the existing interface;
   converting, by the inbound circuit, the received binary data from the binary format to the new data having the second format; and
   making, by the inbound circuit, the converted new data available to a second application in the unsecure network.

2. The method of claim 1, wherein the existing interface is further configured to transfer the process data having the first format through a data diode between the first and second firewalls, the data diode being configured to permit communication from the secure network to the unsecure network while restricting communication from the unsecure network to the secure network.

3. The method of claim 1, wherein the existing interface is further configured to transfer the process data having the first format through a demilitarized zone (DMZ) between the first and second firewalls, the DMZ being configured to further protect the secure network.

4. The method of claim 1, wherein the process data having the first format comprises time-series data from the first application and the new data comprises alarm data from the first application.

5. The method of claim 1, wherein the existing interface is further configured to prevent transfer of the new data having the second format from the secure network to the unsecure network.

6. The method of claim 1, wherein:
   the existing interface comprises a real-time tag configured to track a real-time time-series data stream having the first format from the first application to the second application; and writing the converted binary data comprises writing the converted binary data as the real-time tag.

7. The method of claim 1, further comprising recognizing, by the inbound circuit, the received binary data as having the binary format, wherein converting the received binary data comprises converting the recognized binary data from the binary format to the second format in order to recover the new data.

8. A system for automated transfer of process data from a first application in a secure network to a second application in an unsecure network, the system comprising:
- a first firewall configured to protect the secure network;
- a second firewall configured to protect the unsecure network;
- an existing interface configured to transfer the process data having a first format from the secure network to the unsecure network through the first and second firewalls, the process data further including new data having a second format different from the first format;
- an outbound circuit in the secure network and configured to
  - receive the new data from the first application,
  - convert the received new data from the second format to a binary format, and
  - write the converted binary data to the existing interface as further process data having the first format;
- an interface circuit between the first and second firewalls and configured to transfer the written binary data through the first and second firewalls using the existing interface; and
- an inbound circuit in the unsecure network and configured to
  - receive the transferred binary data from the existing interface,
  - convert the received binary data from the binary format to the new data having the second format, and
  - make the converted new data available to the second application.

9. The system of claim 8, further comprising a data diode between the first and second firewalls, the data diode being configured to permit communication from the secure network to the unsecure network while restricting communication from the unsecure network to the secure network, wherein the existing interface is further configured to transfer the process data having the first format through the data diode.

10. The system of claim 8, further comprising a demilitarized zone (DMZ) between the first and second firewalls, the DMZ being configured to further protect the secure network, wherein the existing interface is further configured to transfer the process data having the first format through the DMZ.

11. The system of claim 8, wherein the process data having the first format comprises time-series data from the first application and the new data comprises alarm data from the first application.

12. The system of claim 8, wherein the existing interface is configured to prevent transfer of the new data having the second format from the secure network to the unsecure network.

13. The system of claim 8, wherein:
- the existing interface comprises a real-time tag configured to track a real-time time-series data stream having the first format from the first application to the second application; and
- writing the converted binary data comprises writing the converted binary data as the real-time tag.

14. The system of claim 8, wherein the inbound circuit is further configured to recognize the received binary data as having the binary format, and converting the received binary data comprises converting the recognized binary data from the binary format to the second format in order to recover the new data.

15. A computer-readable medium (CRM) comprising one or more non-transitory storage media containing instructions that, when executed on one or more computer processors, cause the processors to perform an automated method of transferring process data from a secure network protected by a first firewall to an unsecure network protected by a second firewall using an existing interface, the existing interface being configured to transfer the process data having a first format from the secure network to the unsecure network through the first and second firewalls, the process data further including new data having a second format different from the first format, the method comprising:
- receiving the new data from a first application in the secure network;
- converting the received new data from the second format to a binary format;
- writing the converted binary data to the existing interface as further process data having the first format;
- transferring the written binary data through the first and second firewalls using the existing interface;
- receiving the transferred binary data from the existing interface;
- converting the received binary data from the binary format to the new data having the second format; and
- making the converted new data available to a second application in the unsecure network.

16. The CRM of claim 15, wherein the existing interface is further configured to transfer the process data having the first format through a data diode between the first and second firewalls, the data diode being configured to permit communication from the secure network to the unsecure network while restricting communication from the unsecure network to the secure network.

17. The CRM of claim 15, wherein the existing interface is further configured to transfer the process data having the first format through a demilitarized zone (DMZ) between the first and second firewalls, the DMZ being configured to further protect the secure network.

18. The CRM of claim 15, wherein the process data having the first format comprises time-series data from the first application and the new data comprises alarm data from the first application.

19. The CRM of claim 15, wherein the existing interface is further configured to prevent transfer of the new data having the second format from the secure network to the unsecure network.

20. The CRM of claim 15, wherein:
- the existing interface comprises a real-time tag configured to track a real-time time-series data stream having the first format from the first application to the second application; and
- writing the converted binary data comprises writing the converted binary data as the real-time tag.

21. The CRM of claim 15, wherein the instructions, when executed on the one or more computer processors, further cause the processors to recognize the received binary data as having the binary format, wherein converting the received binary data comprises converting the recognized binary data from the binary format to the second format in order to recover the new data.

* * * * *